United States Patent
LaBosco et al.

(10) Patent No.: US 11,665,007 B2
(45) Date of Patent: *May 30, 2023

(54) POE POWERED DEVICE WITH LINK LAYER STARTUP PROCESSOR

(71) Applicant: Crestron Electronics, Inc., Rockleigh, NJ (US)

(72) Inventors: Mark LaBosco, New City, NY (US); Marc Dubowski, Fishkill, NY (US); John Hartnett, Cortlandt Manor, NY (US)

(73) Assignee: Crestron Electromics, Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,629

(22) Filed: Apr. 20, 2020

(65) Prior Publication Data

US 2020/0244471 A1 Jul. 30, 2020
US 2020/0244471 A1 Jul. 30, 2020

Related U.S. Application Data

(63) Continuation of application No. 15/843,299, filed on Dec. 15, 2017, now Pat. No. 10,630,494.

(51) Int. Cl.
| | |
|---|---|
| *G06F 1/00* | (2006.01) |
| *G06F 11/30* | (2006.01) |
| *H04L 12/10* | (2006.01) |
| *G06F 1/26* | (2006.01) |
| *G06F 1/28* | (2006.01) |
| *H04L 12/12* | (2006.01) |

(52) U.S. Cl.
CPC .............. *H04L 12/10* (2013.01); *G06F 1/266* (2013.01); *G06F 1/28* (2013.01); *H04L 12/12* (2013.01)

(58) Field of Classification Search
CPC ....................................................... H04L 12/10
See application file for complete search history.

(56) References Cited

U.S. PATENT DOCUMENTS

| | | | |
|---|---|---|---|
| 8,935,543 B2* | 1/2015 | Hunter, Jr. .............. | H04L 12/10 713/300 |
| 9,547,350 B2* | 1/2017 | Flynn ........................ | G06F 1/30 |
| 10,060,965 B1* | 8/2018 | Skinner ................ | G01R 31/086 |
| 10,666,723 B2* | 5/2020 | Kitabayashi ............ | H04L 67/32 |
| 2007/0165663 A1* | 7/2007 | Aloni ...................... | H04L 41/12 370/420 |
| 2011/0264941 A1* | 10/2011 | Park ...................... | G06F 1/3218 713/324 |
| 2013/0076133 A1* | 3/2013 | Gammel ................... | H02J 4/00 307/31 |
| 2014/0250327 A1* | 9/2014 | Flynn ..................... | H02J 3/0075 714/22 |
| 2016/0062432 A1* | 3/2016 | Faraz ...................... | G06F 1/266 713/300 |
| 2016/0269187 A1* | 9/2016 | Zhuang .................. | H04L 12/10 |

(Continued)

*Primary Examiner* — Mohammed H Rehman

(74) *Attorney, Agent, or Firm* — Crestron Electronics, Inc.

(57) ABSTRACT

A Power over Ethernet (PoE) Powered Device (60) is described herein that includes an auxiliary processor (62) that negotiates a power level with a PoE Power Sourcing Equipment using a first link layer (650), means for holding the PoE Powered Device in a low power state, and a second link layer (50) that allows the main processor to communicate over the Ethernet.

20 Claims, 9 Drawing Sheets

(56) References Cited

U.S. PATENT DOCUMENTS

| | | | |
|---|---|---|---|
| 2017/0010645 A1* | 1/2017 | Jain | G06F 1/266 |
| 2017/0351236 A1* | 12/2017 | Xu | G05B 19/409 |
| 2018/0019884 A1* | 1/2018 | Radermacher | H04L 12/10 |
| 2018/0375673 A1* | 12/2018 | Wendt | H04L 12/10 |
| 2019/0064914 A1* | 2/2019 | Krishnakumar | H02J 7/0068 |

* cited by examiner

POE POWERED DEVICE WITH LINK LAYER STARTUP PROCESSOR

PRIORITY INFORMATION

The present application claims priority under 35 U.S.C. § 120 as a Continuation Application to U.S. Non-Provisional patent application Ser. No. 15/843,299, filed Dec. 15, 2017, the entire contents of which are expressly incorporated herein by reference.

BACKGROUND OF THE INVENTION

Technical Field

The present invention relates to an apparatus and method for initializing a power over Ethernet (PoE) device using an auxiliary processor.

Background Art

While standards such as IEEE 802.3at and 802.3bt allow for physical layer negotiation of high power during the initial hardware (HW) PoE negotiation, some power sourcing equipment (PSE) such as Cisco switches utilize the HW negotiation only for allocation of up to 13 watts. Powering up a high-performance computer from an isolated 13-watt power supply is difficult. Modern PoE standards allow for up to 100 watts of power, which enables new applications such as personal computers, televisions, digital signage boxes and more to be possible using low voltage power available on the network cable.

Refer first to FIG. 1 which illustrates a Power over Ethernet (PoE) system 1 as is known in the prior art and FIG. 2 which illustrates components within a PoE Powered Device 20. A PoE Power Sourcing Equipment 10, such as a PoE router or switch, is connected to the PoE Powered Device 20 using the four twisted wire data pairs 6A-6D of Cat. 5 Ethernet cable 5, via coupling transformers 12A-12D, within the PoE Power Sourcing Equipment 10, and coupling transformers 22A-22D, within the PoE Powered Device 20.

As shown, the PoE Power Sourcing Equipment 10 provides electrical power to the PoE Powered Device 20 via data pair 6A and data pair 6D. This electrical power is supplied from a PSE Controller 11 and impressed upon data pair 6A and data pair 6D as a common mode voltage using center taps of coupling transformer 12A and 12D, respectively.

Refer now to FIGS. 2 and 3. The PoE Power Sourcing Equipment 10, such as a PoE router or switch, first determines whether the Ethernet connected device, such as PoE Powered Device 20, is PoE-compatible by looking for a signature resistance of 24.9 kΩ, as defined in the IEEE 802.3af standard. More specifically, a low input voltage, typically between 2.7 volts (V1) and 10 volts (V2) is first applied, as a common mode voltage, across the powered data pairs 6A and 6D, by the PoE Controller 11 which allows that controller to detecting the presence of the 24.9 kΩ signature resistor 25.

Once PSE Controller 11 detects a connected PD Controller 21, it will then apply a first (classification) voltage to determine how much electrical power the PoE Powered Device 20 is requesting. The electrical current that is drawn by the PD Controller 21, during this classification 'power level handshake', is determined by the value of the classification resistor 26. The classification current that is measured by the PSE Controller 11 can now be used to determine the power level 'class' of the PoE Powered Device 20 as listed in the table below.

| Class | Measured Current | Powered Device Power Level | Description |
|---|---|---|---|
| 0 | 0-4 mA | 12.95 watts | classification not implemented |
| 1: | 9-12 mA | 3.84 watts | Very Low power |
| 2: | 17-20 mA | 6.49 watts | Low power |
| 3: | 26-30 mA | 12.95 watts | Mid power |
| 4: | 36-44 mA | 12.95 watts | Treat as Class 0 |

The first power level handshake sequence described above, was the complete power level classification sequence performed as part of the overall power-on sequence for PoE devices according to the IEEE 802.3af standard. Devices, such as the PoE Power Sourcing Equipment 10 and the PoE Powered Device 20, that comply with only this, IEEE 802.3af, power on sequence, but not the later PoE power on sequences, such as those defined in the IEEE 802.3at or IEEE 802.3bt standards are characterized as "Type 1" devices according to IEEE 802.3at and later versions of the IEEE 802.3 standard.

Refer now to FIG. 4. FIG. 4 illustrates a hardware-based IEEE 802.3at second power level handshake sequence known to those skilled in the art as a hardware-based 'two-event classification'. A Type 2 PSE Controller 11 (i.e., a PSE Controller that conforms to IEEE 802.3at and later versions of the IEEE 802.3 standard) applies the first (classification) voltage pulse, as above, but a Class 4 response now indicates the PD is a high power device that supports 2-event classification. The PSE then applies a second classification pulse almost immediately thereafter. The use of 2-event classification allows for the identification of an additional (high power) class of PoE Powered Device 20 as shown in the table below.

| Class | Measured Current | Powered Device Power Level | Description |
|---|---|---|---|
| 4 | 36-44 mA | 25.5 watts | High power |

Now, the IEEE 802.3 at standard allows for the second power level handshake sequence to take one of two forms: the hardware-based two-event classification or, alternatively, a software-based link layer discovery protocol (LLDP) classification. Per the IEEE 802.3at standard, each particular PoE Power Sourcing Equipment (PSE) is only required to support only one of these mechanisms. However, PoE Powered Devices (PD) must support both classification methods. In other words, using hardware-based 'two-event classification' is optional for the PSE but mandatory for a Type 2 PD that requires more than 12.95 watts of power. Prior to this second power level handshake taking place, the PD and PSE will each restrict power to IEEE 802.3af limits (i.e., 12.95 watts).

The power negotiation between a PSE and a PD can be implemented at the physical layer or at the data link layer.

Refer now to FIG. 5. FIG. 5 illustrates the data connections and data flow within PoE Powered Device 20. This data flow can be described using the conventions of the Open Systems Interconnection (OSI) conceptual model.

Most network communicating devices have a processor that uses a network MAC peripheral, which provides MAC sublayer 52 functionality, in order to communicate on a network. In some cases, the MAC sublayer 52 is located in the processor System on Chip (SoC), but in others it can be an external peripheral connected to the processor via a communication bus such as PCIe or USB. The MAC sublayer 52 (peripheral) often interfaces with another component called the network PHY 30 that provides the physical layer translation between the network and the MAC.

The physical layer (PHY) comprises the electrical and hardware connections to the Ethernet data pairs 6A-6D, the coupling transformers 22A-22D (collectively identified as 'Magnetics' 32), Physical Medium Dependent (PMD) sublayer 34, Physical Medium Attachment (PMA) sublayer 38, and Physical Coding Sublayer (PCS) 38. Those skilled in the art will recognize that Power over Ethernet (PoE) has been specified for 10 BASE-T, 100 BASE-T, and 1000 BASE-T Ethernet connections.

Many PHY devices can auto-negotiate different networking speeds and physical layer protocols. The interface between the MAC sublayer 52 and PHY 30 typically consists of two types of signals—network data and network management. For network data, common signaling includes MII, GMII, SGMII, etc. For control, a Serial Management Interface (SMI) consisting of an MDC clock and MDIO bidirectional communication signals are often used.

The data link layer 50, shown in FIG. 6, detects and attempts to correct data errors that may occur in the PHY 30. It defines the protocol to establish and terminate a connection between two physically connected devices and also defines the protocol for flow control between them. The data link layer 50 is divided into two sublayers: the Media Access Control (MAC) sublayer 52, which is responsible for controlling how devices in a network gain access to a medium and permission to transmit data, and the Logical Link Control (LLC) sub layer 54, shown in FIG. 6, which is responsible for identifying and encapsulating network layer protocols, and controlling error checking and frame synchronization.

For the prior art implementation shown in FIG. 5, the MAC sublayer 52 comprises a serial MAC interface 522, which can be for example connected to a processor data bus, and an auto negotiation circuit with FIFO memory 521 which can be connected to the PCS 38 portion of the physical layer (PHY) 30. It would be apparent to a person skilled in the art that there exists a defined standard interface between the auto negotiation circuit with FIFO memory 521 and the physical coding sublayer 38, which is known as the 'media independent interface' (MII) 40.

Refer now to FIG. 6, which illustrates a top-level block diagram of both the electrical power flow and the network communication data flow within the prior art PoE Powered Device 20. Processor 2 receives operational power from DC-DC converter 24 and controls data flow across MII 40, which connects the data link layer 50 with the physical layer (PHY) 30. As described above, data link layer 50 comprises a software LLC 54 (sublayer) portion and a hardware MAC 52 (sublayer) portion. The Link Layer Control (LLC) portion consists of software that runs on processor 2.

In order for the PoE Powered Device 20 to request higher power levels (i.e., >13 watts) from a PSE that does not support a hardware-based 'two-event classification', network communication between the PSE 10 and the PoE Powered Device 20 is required. It is known in the prior art to use link layer discovery protocol (LLDP) and/or Cisco Discovery Protocol (CDP) messages during such network communication.

After the PoE link is powered at the physical layer (PHY) 30, the PSE 10 can use LLDP to repeatedly query the PD 20 to discover the power needs of the PD. Communication over the data link layer 50 allows finer control of power allotment, which makes it possible for the PSE 10 to supply dynamically the power levels needed by the PD 20.

However, the inventors have discovered that it can be difficult to power up and boot a computer device that is substantial enough to provide the network communications required to establish the software-based link layer discovery protocol (LLDP) classification while still staying within the 12.95-watt limit (i.e., the maximum power level that can be negotiated with an IEEE 802.3af first hardware handshake). On several occasions the inventors have had to develop a PoE Powered Device 20 that was required to operate with a PoE Power Sourcing Equipment PSE 10 that did not support the hardware-based 'two-event classification', described above. In each of these cases they were required to implement special boot software to issue the LLDP messages prior to booting the main operating system.

Disadvantageously, it is often required that special low power hardware and significant amount of power management code has to be developed to boot up a PoE PD device that relies on software-based link layer discovery protocol (LLDP) communications with a PSE that does not support hardware-based 'two-event classification'. This can add a significant amount of development cost and increased development time associated with the effort to develop network communicating code in the boot loader of a device.

Since certain PoE Power Sourcing Equipment that comply with IEEE 802.3at do not support hardware-based two event classification, there exists a need to limit power consumption during the initialization of a PoE system that provides more than approximately 13 watts.

SUMMARY OF THE INVENTION

It is to be understood that both the general and detailed descriptions that follow are exemplary and explanatory only and are not restrictive of the invention.

The preferred embodiment of the present invention is described herein in the context of a PoE Powered Device negotiating its power requirements with a PoE Power Sourcing Equipment using LLDP, but is not limited thereto, except as may be set forth expressly in the appended claims.

According to a first aspect, the present invention provides a Power over Ethernet (PoE) system comprising a PoE Power Sourcing Equipment and a PoE Powered Device. The PoE Power Sourcing Equipment includes a PSE Controller connected to a first end of an Ethernet cable. The PoE Powered Device includes a PD Controller connected to a second end of the Ethernet cable. The PoE Powered Device further comprises (i) a main processor, (ii) an auxiliary processor configured for negotiating a power level with the PoE Power Sourcing Equipment using a first data link layer, (iii) means for holding the PoE Powered Device in a low power state, and (iv) a second data link layer, wherein the main processor is configured for communicating over the Ethernet cable using the second data link layer.

According to a second aspect, the present invention provides a PoE Powered Device comprising: (a) a main processor; (b) an auxiliary processor configured for negotiating a power level with a PoE Power Sourcing Equipment using a first data link layer, (c) means for holding the PoE Powered Device in a low power state, and (d) a second data link layer; (e) wherein said main processor is configured for network communicating using the second data link layer.

According to a third aspect, the present invention provides a PD controller suitable for use within a PoE powered device, said controller comprising: (a) powered device controller circuitry; (b) a physical medium dependent sublayer; and (c) a data switch operable to selectively connect either a first physical medium attachment sublayer or a second physical medium attachment sublayer to said physical medium dependent sublayer.

According to a fourth aspect, the present invention provides a method for initializing a Power over Ethernet (PoE) connection. The method comprises: (a) connecting a PoE Power Sourcing Equipment to a PoE Powered Device, said PoE Power Sourcing Equipment further comprising a PSE Controller; (b) performing, at the PSE Controller, a first classification in accordance with IEEE 802.3af; (c) booting up an auxiliary processor; (d) determining whether a second classification, in accordance with IEEE 802.3at has been performed; (e) when said second classification has not been performed, negotiating, by the auxiliary processor, a power level using link layer discovery protocol (LLDP); (f) booting up a main processor.

The present invention seeks to overcome or at least ameliorate one or more of several problems, including but not limited to: simplifying the power up hardware and boot code of a (high power) processor subsystem that is powered by a PoE Power Sourcing Equipment.

BRIEF DESCRIPTION OF DRAWINGS

The accompanying figures further illustrate the present invention. Exemplary embodiments are illustrated in reference figures of the drawings. It is intended that the embodiments and figures disclosed herein are to be considered to illustrative rather than limiting.

The components in the drawings are not necessarily drawn to scale, emphasis instead being placed upon clearly illustrating the principles of the present invention. In the drawings, like reference numerals designate corresponding parts throughout the several views.

LIST OF REFERENCE NUMBERS FOR THE MAJOR ELEMENTS IN THE DRAWING

Figure 1:
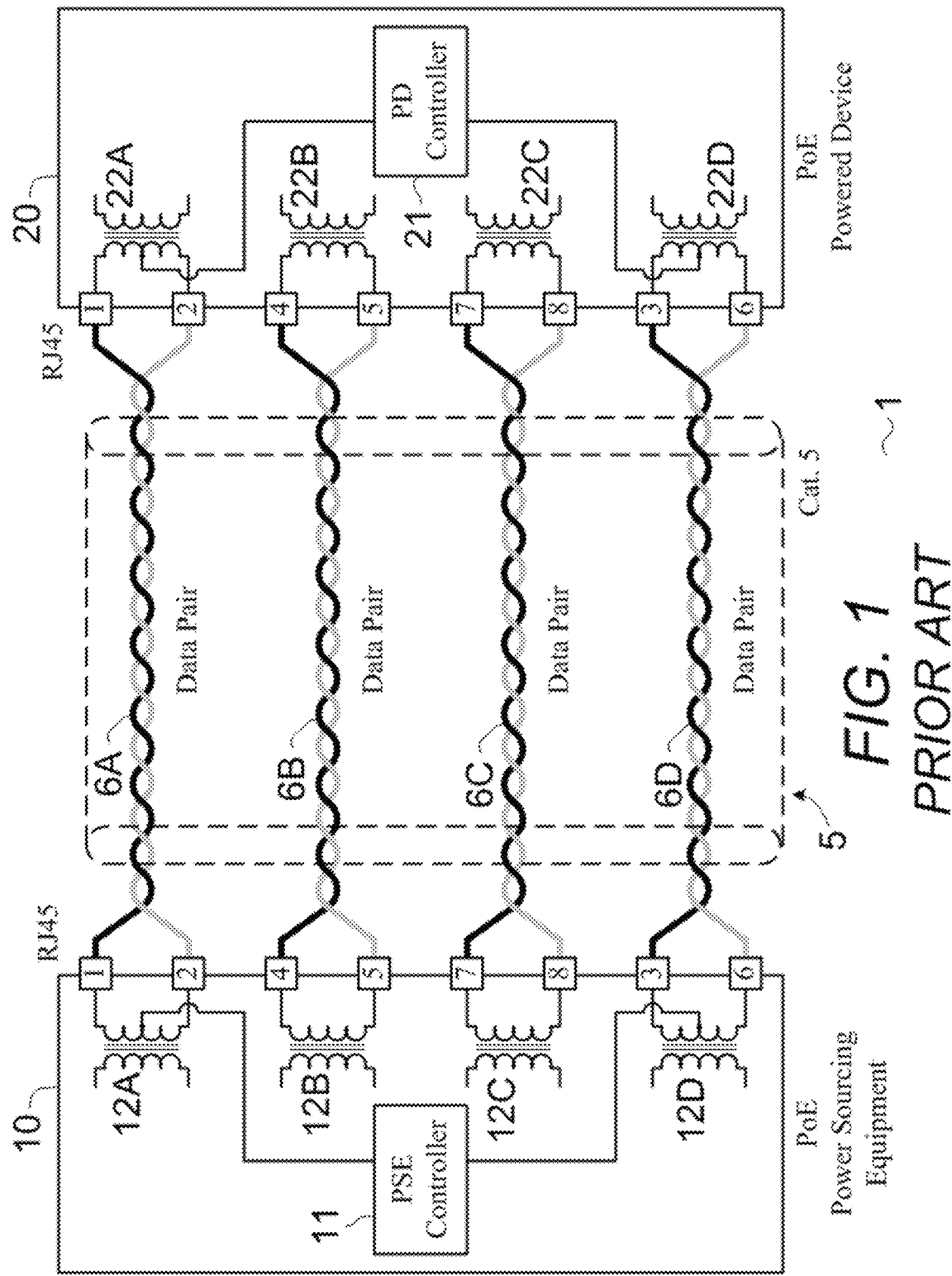
FIG. 1 illustrates a block diagram of a Power over Ethernet (PoE) system comprising a Power Source Equipment (PSE) and a Powered Device (PD), as known in the prior art.

The following is a list of the major elements in the drawings in numerical order.

1 Power over Ethernet (PoE) system
2 processor, main processor
5 Ethernet cable
6A-D data pair (p/o Ethernet cable 5)
10 PoE Power Sourcing Equipment
11 PSE Controller (p/o PoE Power Sourcing Equipment 10)
12A-D coupling transformer(s) (p/o PoE Power Sourcing Equipment 10)
20 PoE Powered Device (prior art device)
21 PD controller, PD controller circuitry
22A-D coupling transformer(s) (p/o PoE Powered Device 20)
23 full-wave rectifier (p/o PoE Powered Device 20)
24 DC-DC converter (p/o PoE Powered Device 20)
25 signature resistor (p/o PoE Powered Device 20)
26 classification resistor (p/o PoE Powered Device 20)
30 Ethernet physical layer (PHY)
32 magnetics (comprising coupling transformers 22A-D)
34 physical medium dependent (PMD) sublayer (p/o PHY 30)
36 physical medium attachment (PMA) sublayer (p/o PHY 30)
38 physical coding sublayer (PCS) (p/o PHY 30)
40 media independent interface (MII)
50 data link layer (prior art)
52 media access control (MAC) sublayer (p/o link layer 50)
54 link layer control (LLC) sublayer (software) (p/o link layer 50)
60 PoE Powered Device (inventive device)
62 auxiliary processor (p/o PoE PD)
67 power relay (p/o PoE PD)
68 data switch (p/o PoE PD 60)
70 PoE Powered Device (inventive device)
78 data switch (p/o PoE PD 70)
215 first input (of PD Controller 21)
216 second input (of PD Controller 21)
521 auto negotiation circuit with FIFO memory (p/o PoE PD 20)
522 serial MAC interface (p/o PoE PD 20)
216 second input (of PD Controller 21)
650 auxiliary data link layer (p/o PoE PD)
652 auxiliary MAC sublayer (p/o auxiliary data link layer 650)
654 auxiliary LLC sublayer (software) (p/o auxiliary data link layer 650)
736 auxiliary PMA sublayer (p/o PoE PD 70)
738 auxiliary PCS (p/o PoE PD 70)
740 auxiliary MII
910 (step of) connecting power sourcing equipment to powered device and performing a single-event classification
920 (step of)
920 (step of) booting up an auxiliary processor
930 (step of) determining whether a second classification in accordance with IEEE 802.3 at has been performed
940 (step of) negotiating power setting by auxiliary processor using link layer discovery protocol (LLDP) when second classification has not been performed
950 (step of) enabling power relay by auxiliary processor
960 (step of) booting up a main processor
970 (step of) enabling data transfer switch

DETAILED DESCRIPTION OF THE INVENTION

The present invention is generally implemented as an additional component that can be added to certain PoE Powered Devices (PD) to allow for use of these devices with certain other PoE Power Supplying Equipment (PSE). Hence, an illustrative Power over Ethernet system and its operation will be described initially.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

Figure 7:
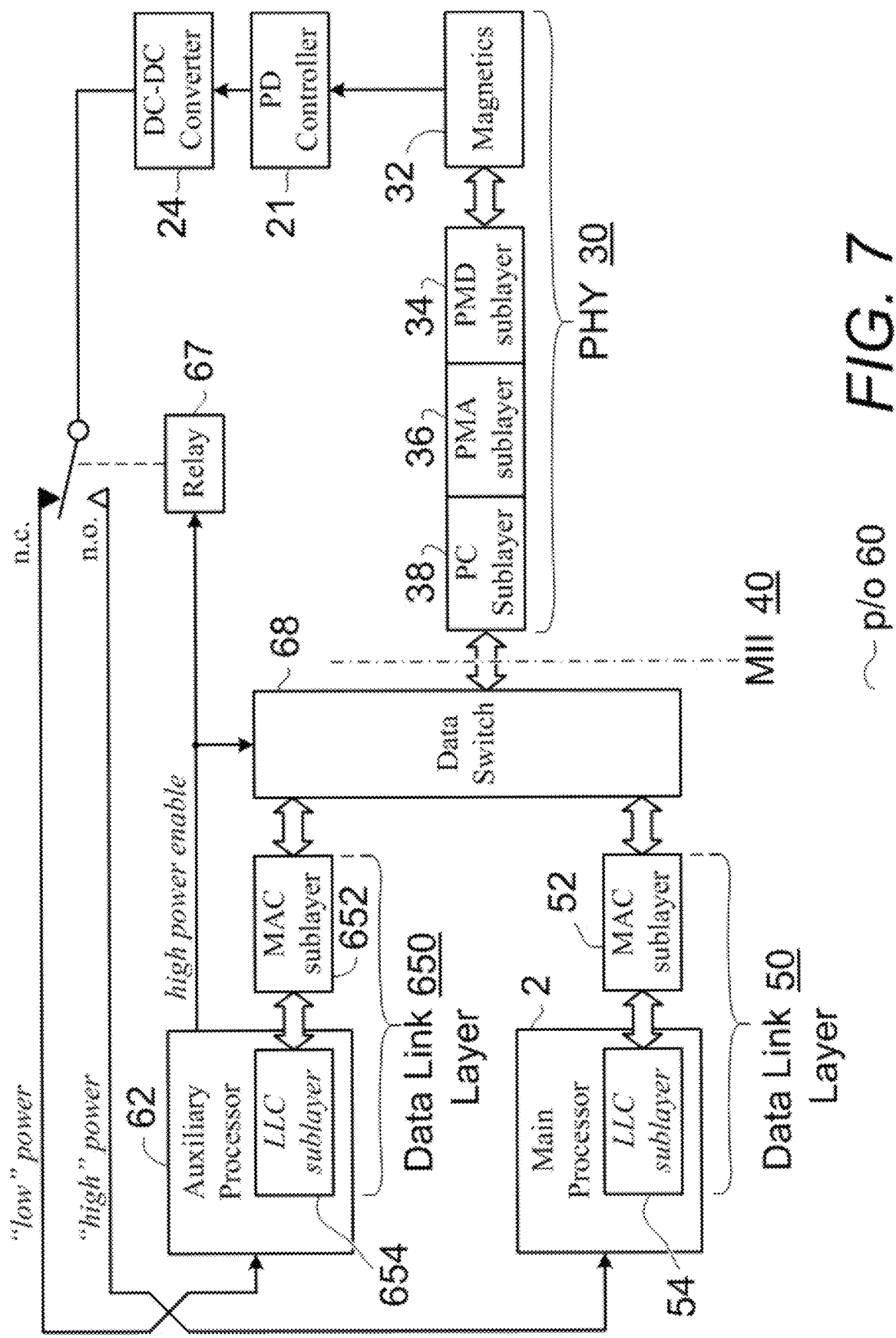
FIG. 7 is a functional block diagram of an inventive PoE Powered Device (PD), according to a first illustrative embodiment of the present invention.

Refer now to FIG. 7. FIG. 7 depicts the electrical power and network data flow within an inventive PoE Powered Device (PD) 60 in accordance with a first illustrative embodiment of our invention. An auxiliary low power processor 62, such as a central processing unit (CPU) within the inventive PoE Powered Device 60 provides the initial network communication between that PD and a PSE (not shown), which allows for relatively low power consumption from the PoE bus during initialization.

This small auxiliary low power processor 62 can mimic a typical larger main processor 2 (i.e., CPU), during the power negotiating process while still limiting the amount of required electrical power. For example, a typical PoE Powered Device that is suitable for the present invention could be a wall-mounted touch panel display which has a power consumption of 20 watts. On the other hand, the small auxiliary processor 62, which operates well under the 12.95 watt limit of IEEE 802.3af, is able to monitor the result of the IEEE 802.3af first hardware handshake and determine if enough power was granted to power up the main system, such as the wall-mounted touch panel display. If sufficient electrical power was granted, the auxiliary processor 62 can signal the remainder of the system that power is available and transfer control and power to the main processor 2. In the embodiment shown in FIG. 7, such power transfer is accomplished by relay 67; however, the invention contemplates that other means of power transfer may be used including but not limited to semiconductor devices, such as switching transistors.

Figure 2:
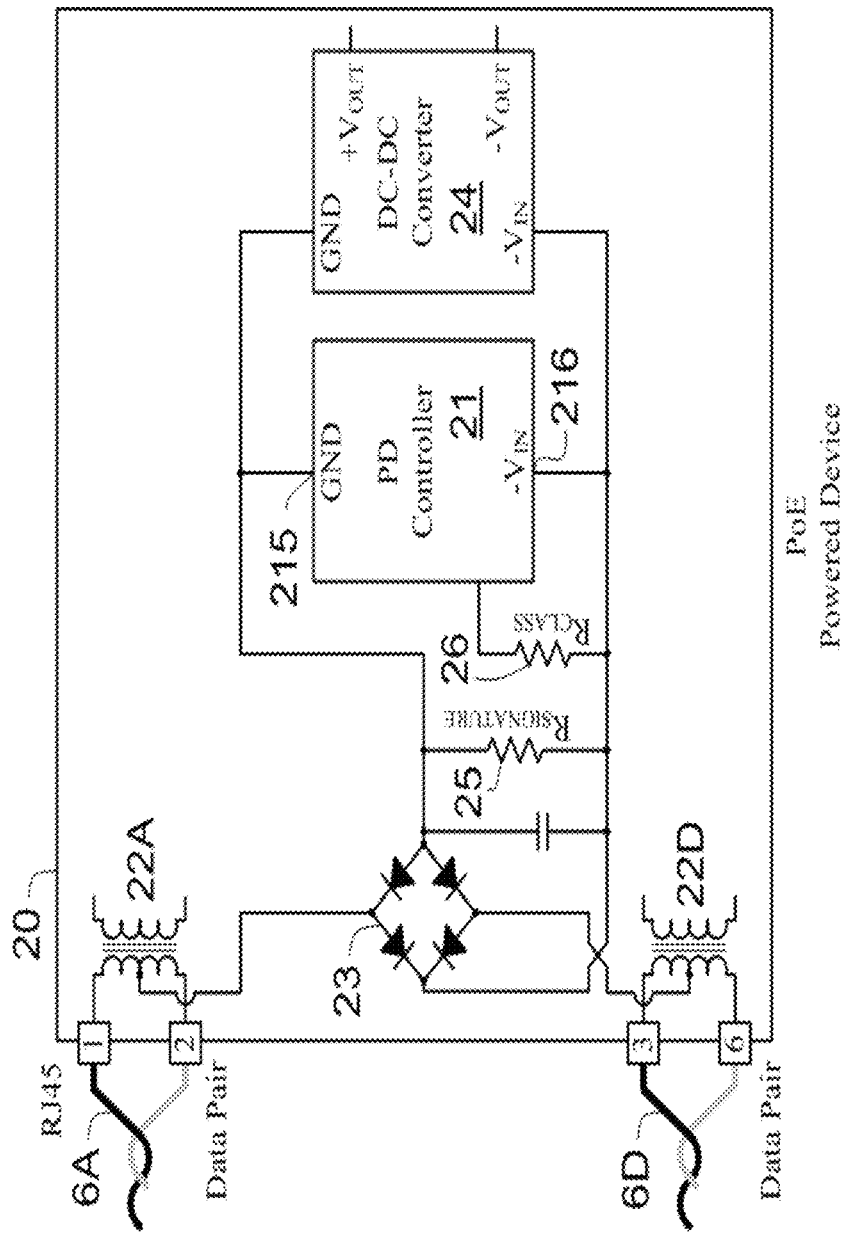
FIG. 2 illustrates further details of the PoE Powered Device (PD) shown in FIG. 1.
Figure 3:
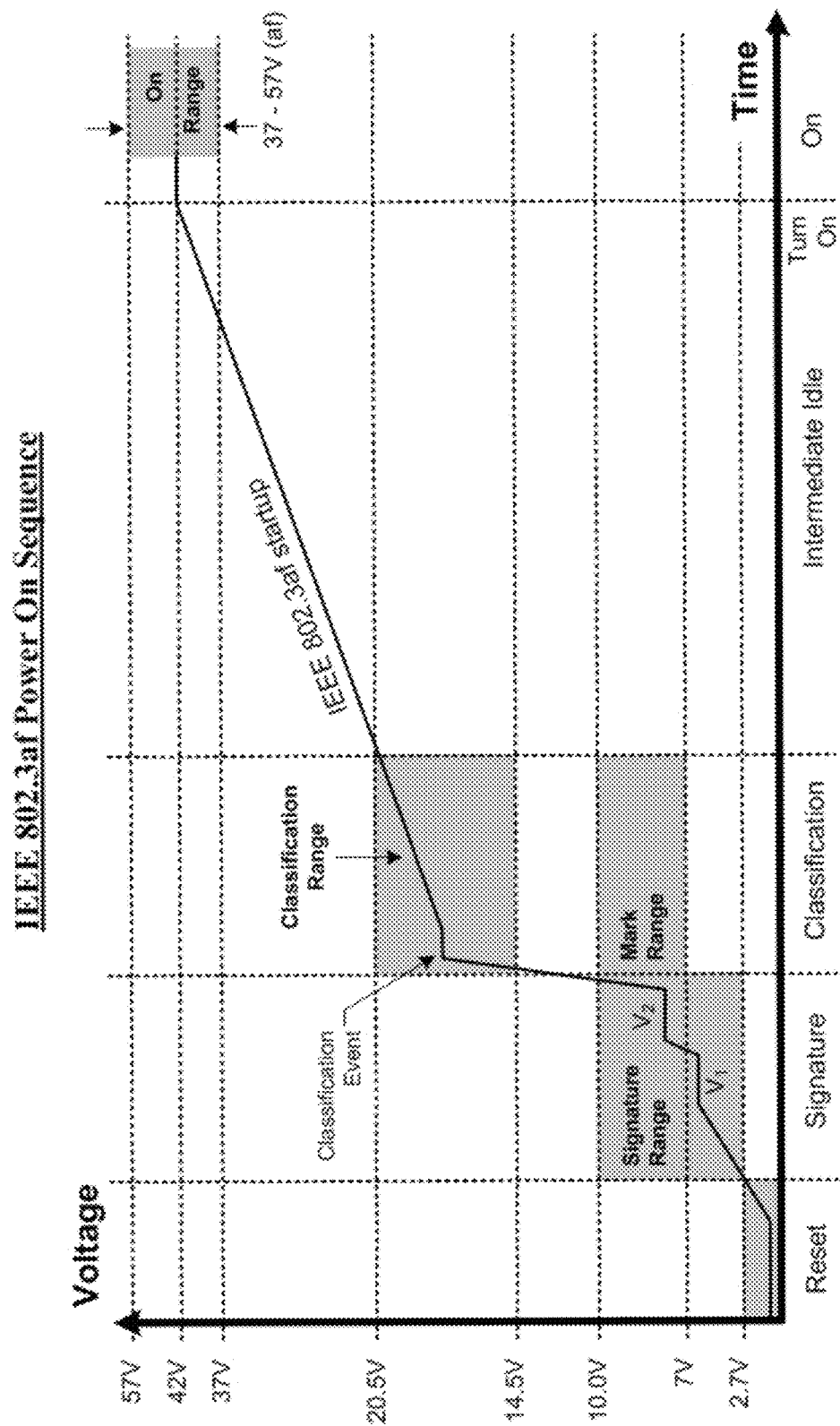
FIG. 3 depicts a timing diagram that shows the power on sequence for a PoE Powered Device (PD) in accordance with IEEE 802.3af, as known in the prior art.
Figure 4:
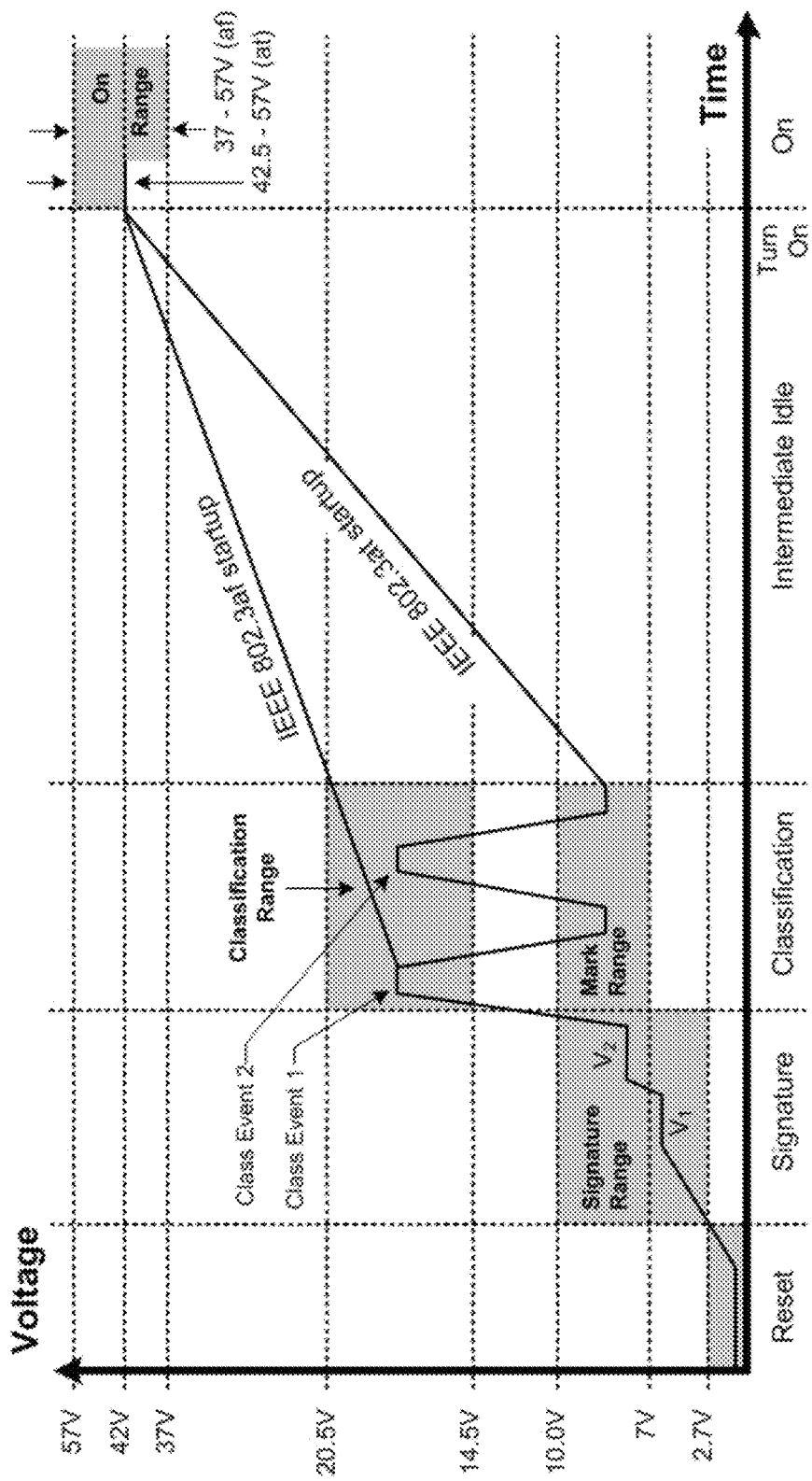
FIG. 4 depicts a timing diagram that shows the power on sequence for a PoE Powered Device (PD) in accordance with IEEE 802.3at, as known in the prior art.
Figure 5:
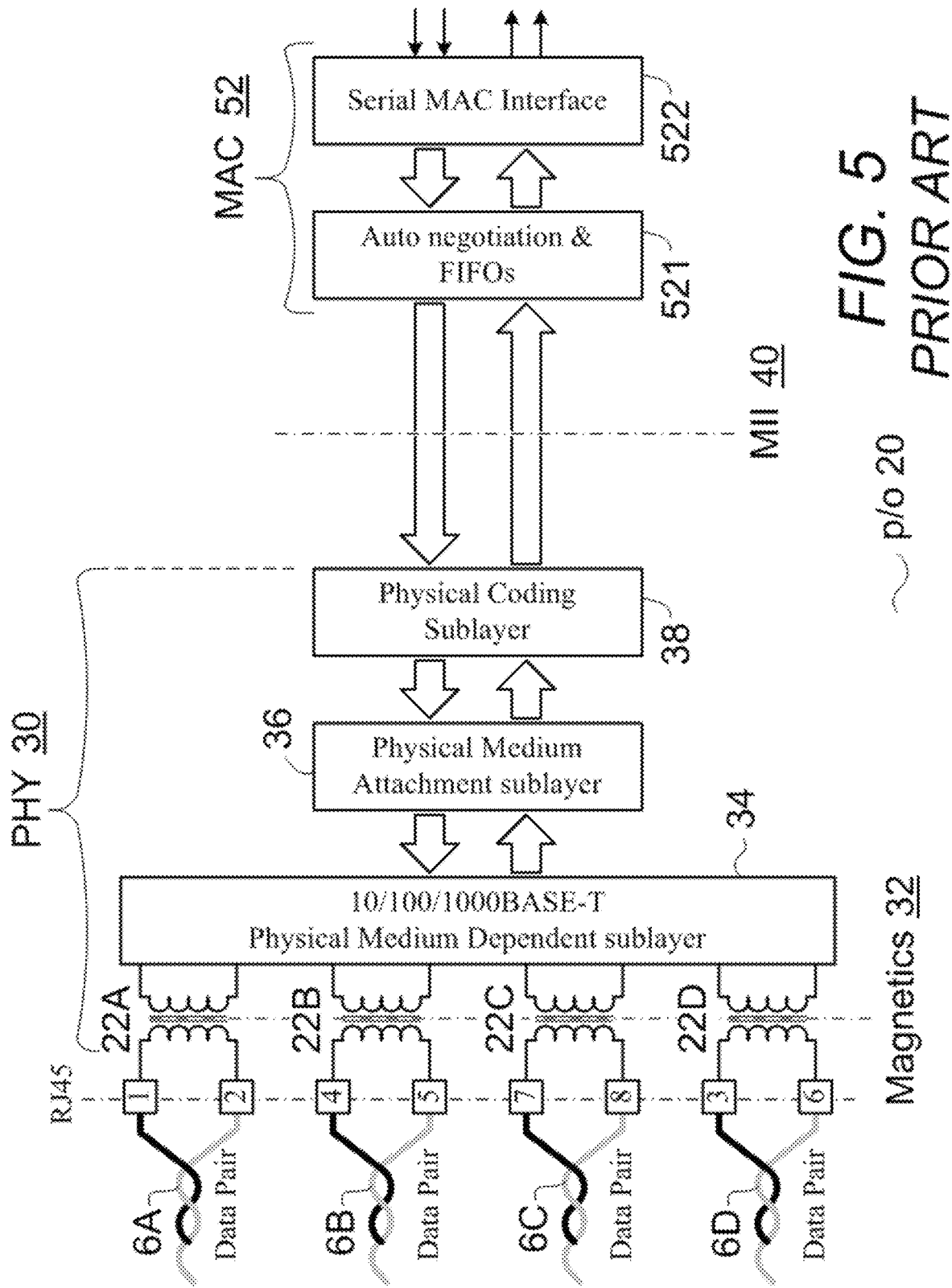
FIG. 5 illustrates the Ethernet data flow, by OSI layer, through the hardware of the PoE Powered Device (PD) shown in FIG. 1.
Figure 6:
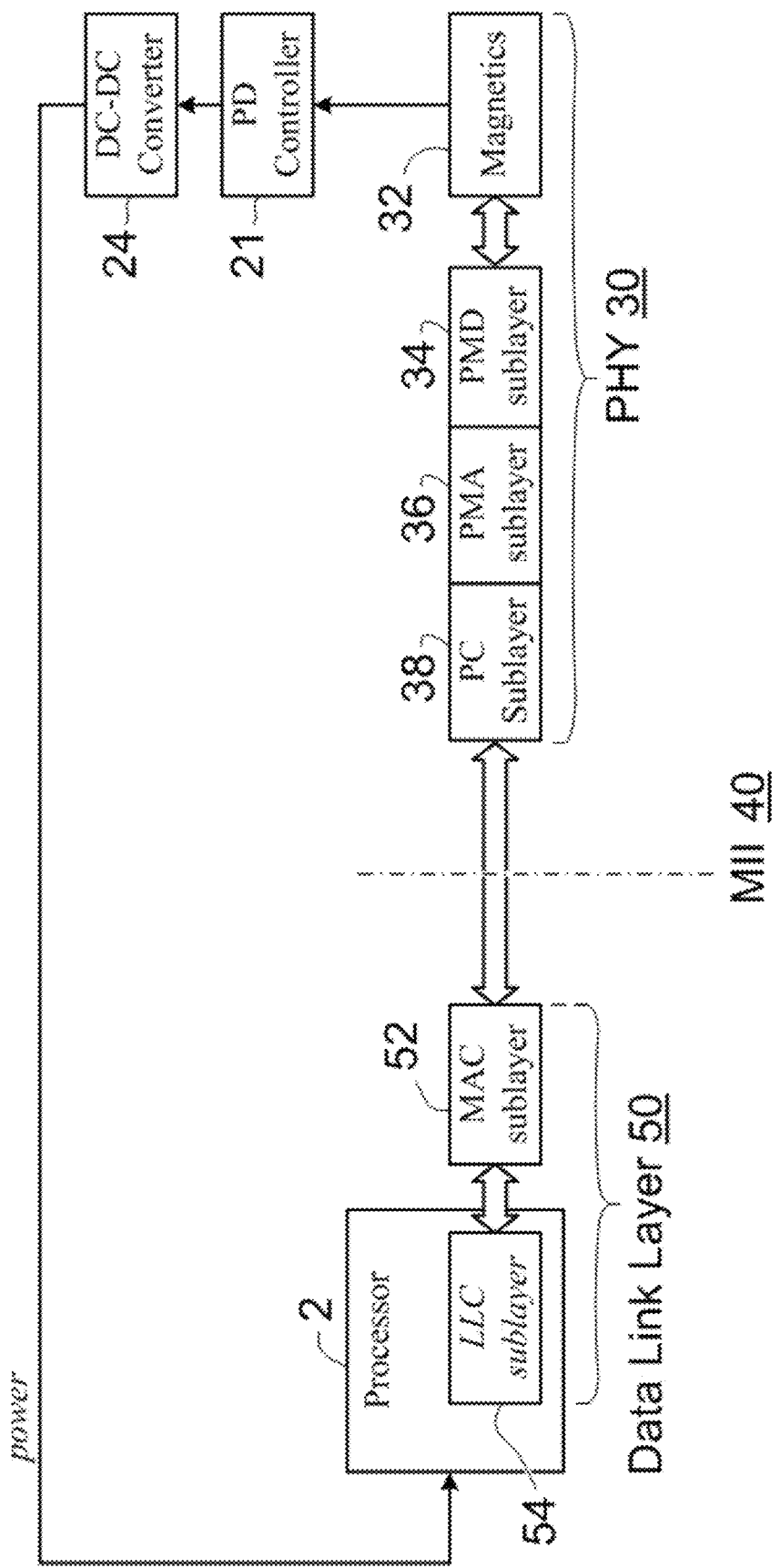
FIG. 6 is a functional block diagram of a PoE Powered Device (PD), as known in the prior art.

During a typical startup for the embodiment illustrated in FIG. 7, the PoE Powering Sourcing Equipment (PSE), not shown, will have identified PoE Powered Device 60 as a PoE device by detecting the PoE signature resistance of 24.9 kΩ, such as the signature resistor 25 shown in FIG. 2. Further, the PSE will have also performed the first hardware handshake of IEEE 802.3af.

Assume that the PSE has not implemented classification, under IEEE 802.3af, and also does not support the hardware-based two-event classification scheme of IEEE 802.3at. In other words, assume that the PSE only supports the software-based link layer discovery protocol (LLDP) classification scheme of IEEE 802.3at.

The auxiliary processor 62 can control the data and management interfaces of the Ethernet PHY 30 through its control of data switch 68. Accordingly, the auxiliary processor can initialize the Ethernet PHY 30 via management data clock (MDC) and management data input/output signal (MDIO) signals across the media independent interface (MII) 40. In this embodiment, the auxiliary processor 62 is associated with an auxiliary data link layer 650 that comprises an LLC sublayer 654 that can be implemented as software running in the auxiliary processor 62, and a MAC sublayer 652 that can be implemented as an integrated circuit (IC) chip. In this embodiment, data to/from the main processor 2 flows via media access control (MAC) sublayer 52 to/from the data switch 68. Data to/from the auxiliary processor 62 flows via auxiliary MAC sublayer 652 to/from the data switch 68.

The auxiliary processor 62 can, via the auxiliary data link layer 650, issue either link layer discovery protocol (LLDP) or Cisco Discovery Protocol (CDP) requests for sufficient power to run the entire subsystem (of which the PoE Powered Device 20 is a component). When the PSE grants, via LLDP/CDP responses, the power requested the auxiliary processor 62 can signal to the main processor 2 that there is enough electrical power available to boot-up and operate. Once the main processor 2 is up and running, then either the auxiliary processor 62 or the main processor 2 can switch the PHY 30 network management and data signals from the auxiliary MAC sublayer 652 to the main MAC sublayer 52, by operating data switch 68.

Advantageously, the above referenced LLDP/CDP can also be used to negotiate the higher power levels defined in the IEEE 802.3bt standard; up to 100 watts via four powered pairs (i.e., "4-pair mode").

In one embodiment of the present invention, auxiliary processor 62 acts to mimic the main processor 2, by using information that is stored in a programmable read-only memory PROM (not shown) that is accessible to the auxiliary processor 62. For example, this PROM could store the MAC address associated with the main processor 2, required PoE power level (i.e., 2-pair or 4-pair), and other product information.

In a further embodiment, an inter-processor communication bus (not shown), such as for example an I2C or SPI bus, is provided between the auxiliary processor 62 and the main processor 2 so that the auxiliary processor can transfer status information to the main processor 2 prior to the handoff switch of the PHY 30. Such status information can include negotiated speed, duplex setting, and other information about the power negotiation grant.

A small central processing unit (CPU) integrated circuit is one example of a suitable auxiliary processor 62, but a hardware coded state machine, such as for example a state machine implemented on a field programmable gate array (FPGA), could also function as an auxiliary processor in accordance with the present invention.

Figure 8:
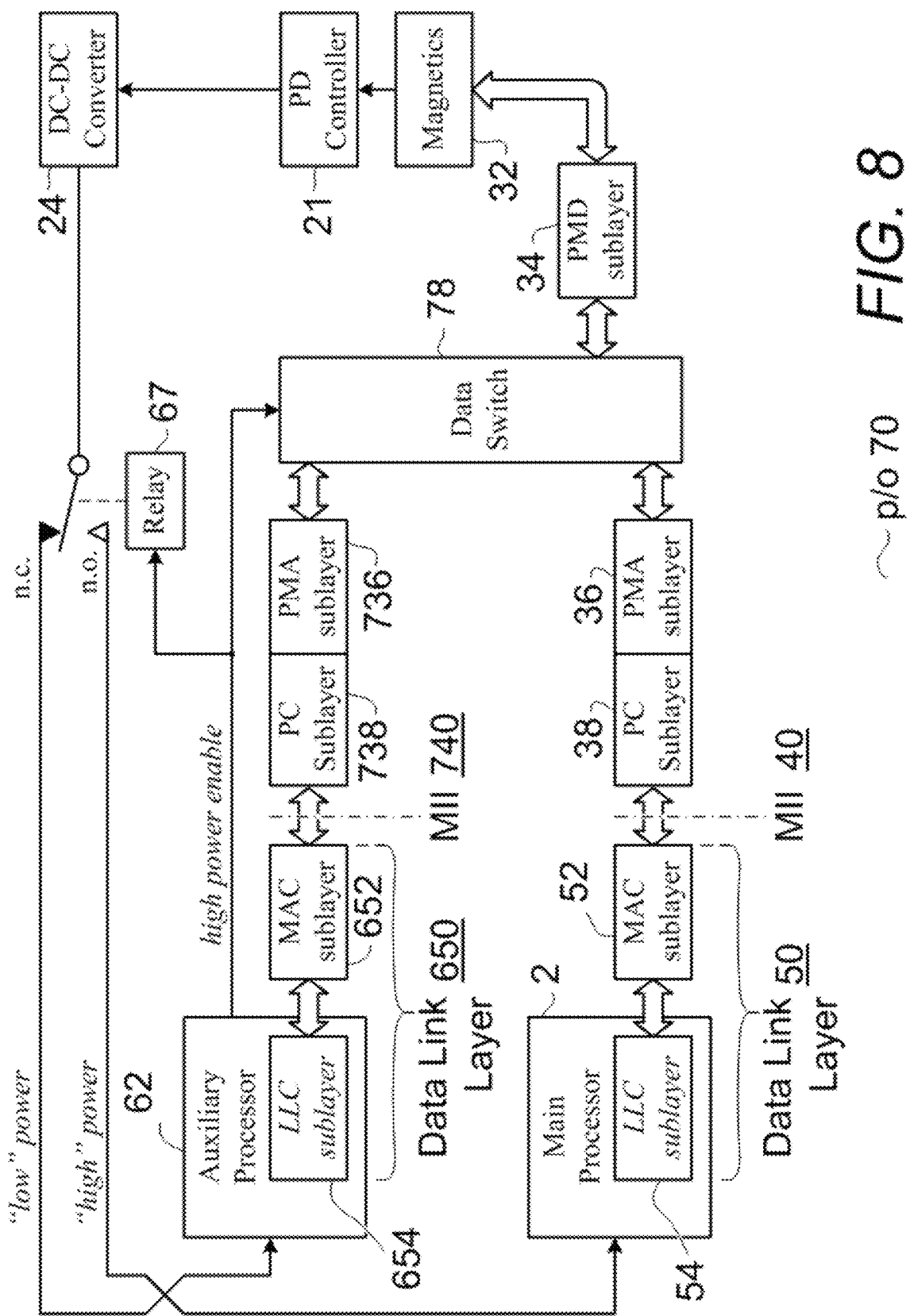
FIG. 8 is a functional block diagram of an inventive PoE Powered Device (PD), according to a second illustrative embodiment of the present invention.

Refer now to FIG. 8. FIG. 8 shows the block diagram of a PoE Powered Device in accordance with a second embodiment of the present invention. In this second embodiment, the switching function, performed by data switch 78 is done at the PHY/Transformer interface. In a further embodiment, the data switch 78, the PMD sublayer 34, and PD controller circuitry 21 are incorporated onto an inventive integrated circuit chip using techniques known to those skilled in the art.

In the embodiment shown in FIG. 8, data switching between the auxiliary processor 62 and the main processor 2 is accomplished within the physical layer (PHY); the data switch 78 is now placed between sublayers of the PHY. More specifically, the inventive PHY includes a single PMD sublayer 34, multiple physical coding sublayers 38 and 73, and multiple physical medium attachment sublayers 36 and 736. In this embodiment, data to/from the main processor 2 flows via media access control (MAC) sublayer 52, media independent interface (MII) 40, physical coding sublayer (PCS) 38, and physical medium attachment (PMA) sublayer 36 to/from the data switch 78. Data to/from the auxiliary processor 62 flows via auxiliary MAC sublayer 652, auxiliary MII 740, auxiliary PCS 738, and auxiliary PMA sublayer 736 to/from the data switch 78.

In this embodiment, the auxiliary processor 62 can then issue either link layer discovery protocol (LLDP) or Cisco Discovery Protocol (CDP) requests for sufficient power to run the entire subsystem as described above. And when the main processor 2 is up and running, then either the auxiliary processor 62 or the main processor 2 can switch the PHY network management and data signals from the auxiliary PMA sublayer 736 to the main PMA sublayer 36, by operating data switch 78.

Figure 9:
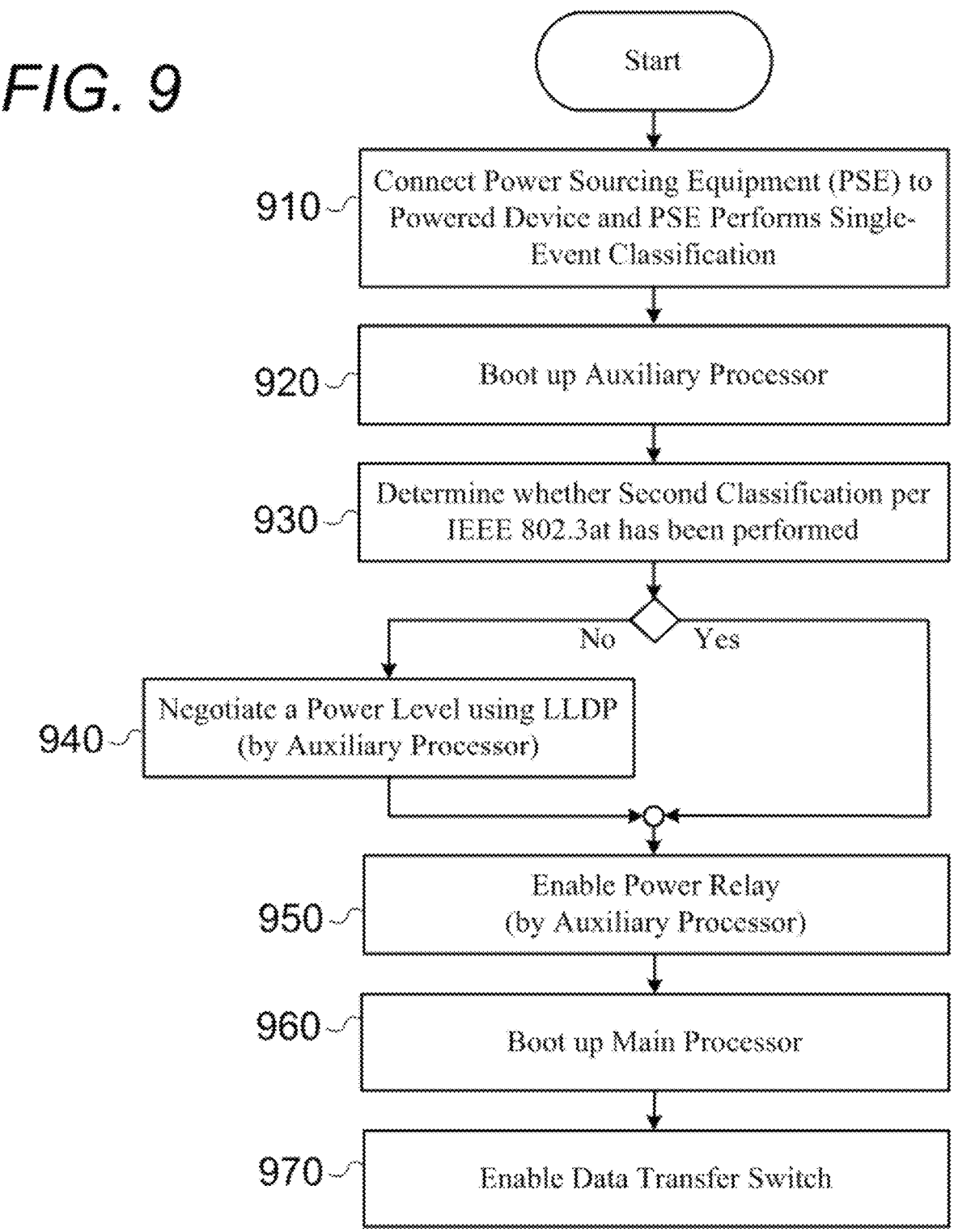
FIG. 9 illustrates the steps of an inventive method for negotiating a power level between the inventive Powered Device (PD) of FIG. 7 and a Power Source Equipment (PSE).

Refer now to FIG. 9 and continue to refer to FIGS. 1-8. FIG. 9 depicts the steps performed by one illustrative method according to the present invention. First (step 910), the PoE Power Sourcing Equipment 10 is connected to the inventive PoE Powered Device 70 and the PoE Sourcing Equipment 10 performs a single-event classification. Next (step 920), the auxiliary processor 62 is booted up and establishes network communication with the PoE Sourcing Equipment 10 using link layer discovery protocol (LLDP). At this point, the auxiliary processor 62 is selectively connected, by data transfer switch 68, with Ethernet cable 5 via physical medium dependent (PMD) sublayer 34 and the magnetics 32, such as coupling transformers 22A-D. It is determined (step 930), such as by the auxiliary processor 62, whether or not a second hardware classification in accordance with IEEE 802.3at has been performed by the PoE Power Sourcing Equipment 10. For the condition where such a second classification has not been performed, the auxiliary processor now (step 940) negotiates the power level required, by the entire system associated with the inventive PoE Powered Device 70, with the PoE Power Sourcing Equipment 10 using LLDP. Next (step 950), the auxiliary processor 62 enables power relay 67 to provide operational power to the main processor 2. Main processor 2 is then booted up (step 960) and becomes ready to both maintain network communication with PoE Sourcing Equipment 10 and to communicate over Ethernet cable 5 in general (i.e., with all other networked devices). Finally (step 970), the data transfer switch 68 is enabled to selectively connect the main processor 2 with Ethernet cable 5 via physical medium dependent (PMD) sublayer 34 and the magnetics 32, such as coupling transformers 22A-D.

The present invention can be used on any product that uses PoE power and requires more than 13 watts. For example, Cisco has developed a PoE implementation called Universal Power over Ethernet (UPoE). UPoE can use all four data pairs in an Ethernet cable, after negotiation, to supply up to 60 watts of electrical power. The newly emerging IEEE 802.3bt standard also allows for the use of all four data pairs in an Ethernet cable to provide up to supply up to 100 watts of electrical power.

INDUSTRIAL APPLICABILITY

To solve the aforementioned problems, the present invention is a unique system in which an auxiliary low-power processor is used to negotiate the power requirements for a high-power main processor in the context of a Power over Ethernet system that includes a PoE Power Sourcing Equipment and a PoE Powered Device.

LIST OF ACRONYMS USED IN THE DETAILED DESCRIPTION OF THE INVENTION

The following is a list of the acronyms used in the specification in alphabetical order.

10 BASE-T 10 Megabits per second, baseband, twisted pair wiring (Ethernet service level description)

100 BASE-T 100 Megabits per second, baseband, twisted pair wiring (Ethernet service level description)

1000 BASE-T 1 Gigabit per second, baseband, twisted pair wiring (Ethernet service level description)

CDP Cisco Discovery Protocol (a proprietary data link layer protocol developed by Cisco Systems)

CPU central processing unit (typically an integrated circuit chip)

DLC data link layer classification (defined as part of the IEEE 802.3at standard)

FIFO first-in, first-out (memory circuit)

FPGA field programmable gate array (typically an integrated circuit chip)

GMII gigabit media independent interface (defined in IEEE 802.3)

HW hardware

I2C inter-IC (two wire interface and serial protocol)

IC integrated circuit (a chip)

IEEE Institute of Electrical and Electronics Engineers (standards organization)

kΩ kilo-ohm (measure of electrical resistance)

LLC logical link control (sublayer p/o data link layer)

LLDP link layer discovery protocol mA milli-amp (measure of electrical current)

MAC media access control (layer—p/o ISO network stack)

MDC management data clock (used with MDIO interface)

MDIO management data input/output (defined by IEEE 802.3)

MII media independent interface (OSI terminology)

OSI Open Systems Interconnection (conceptual model of a network)

PCS physical coding sublayer (p/o physical layer)

PD powered device (for PoE system)

PCIe Peripheral Component Interconnect Express (personal computer backplane bus)

PHY physical link layer (p/o ISO network stack)

PLC physical link layer classification (defined as part of the IEEE 802.3at standard)

PMD physical medium dependent sublayer (p/o physical layer)

PoE Power over Ethernet (IEEE 802.3af standard)

PoE+ Power over Ethernet Plus (high power) (IEEE 802.3at and 802.3bt standards)

PROM programmable read-only memory (typically an integrated circuit chip)

PSE power sourcing equipment (for PoE system)

SGMII Serial Gigabit Media Independent Interface (defined by Cisco Systems, Inc.)

SMI serial management interface

SoC system-on-a-chip

SPI serial peripheral interface (has separate clock and data lines)

TLV Type, Length, Values (IEEE 802.3at extensions to LLDP protocol)

UPoE Universal Power over Ethernet (non-standard POE developed by Cisco)

USB universal serial bus (specification for specific type of data bus)

V volt (measure of electrical potential—voltage)

ALTERNATE EMBODIMENTS

Alternate embodiments may be devised without departing from the spirit or the scope of the invention. For example, the auxiliary processor 72 could be mounted externally from the PoE Powered Device 70 or Currently this invention would add the cost of an additional CPU and switch logic, but if this were incorporated inside the networking PHY IC, the cost should be relatively inexpensive.

What is claimed is:

1. A Power over Ethernet (PoE) system comprising:
a PoE Power Sourcing Equipment (PSE), including a PSE Controller, connected to a first end of an Ethernet cable;
a PoE Powered Device (PD), including a PD Controller, connected to a second end of the Ethernet cable, wherein the PoE PD further comprises:
a main processor,
an auxiliary processor configured to negotiate a power level with the PoE Power Sourcing Equipment using a first data link layer in a communications process that is conducted as a software based link layer discovery protocol classification scheme, and further configured to hold the PoE Powered Device in a low power state, and
a second data link layer in a communications process that is conducted as a software based link layer discovery protocol classification scheme, wherein the main processor is configured to communicate over the Ethernet cable using the second data link layer; and
a switching device configured to receive a signal from the auxiliary processor that transfers power from the auxiliary processor to the main processor after the power level negotiation.

2. The system according to claim 1, wherein the switching device comprises:
a power relay configured to direct electrical power supplied by a DC-DC converter to either the main processor or the auxiliary processor.

3. The system according to claim 1, wherein the switching device comprises:
a switching transistor configured to direct electrical power supplied by a DC-DC converter to either the main processor or the auxiliary processor.

4. A Power over Ethernet (PoE) Powered Device (PD) comprising:
a main processor;
an auxiliary processor configured to negotiate a power level with a PoE Power Sourcing Equipment using a first data link layer in a communications process that is conducted as a software based link layer discovery protocol classification scheme, and further configured to hold the PoE Powered Device in a low power state;
a second data link layer in the communications process that is conducted as a software based link layer discovery protocol classification scheme, wherein the main processor is configured for network communications using the second data link layer; and
a switching device configured to receive a signal from the auxiliary processor that transfers power from the auxiliary processor to the main processor after the power level negotiation.

5. The device according to claim 4, further comprising:
a non-volatile memory associated with the auxiliary processor and configured to store a MAC address associated with the main processor, and a required PoE power level.

6. The device according to claim 4, wherein the auxiliary processor is selected from the group consisting of a central processing unit (CPU) integrated circuit, and a state machine implemented on a field programmable gate array (FPGA).

7. The device according to claim 4, wherein the switching device comprises:
a power relay configured to direct electrical power supplied by a DC-DC converter to either the main processor or the auxiliary processor.

8. The device according to claim 4, wherein the switching device comprises:
a switching transistor configured to direct electrical power supplied by a DC-DC converter to either the main processor or the auxiliary processor.

9. The device of claim 4, further comprising:
an inter-processor communication bus connected between the auxiliary processor and the main processor, and wherein;
the inter-processor communication bus is configured to transfer status information from the auxiliary processor to the main processor prior to transferring power.

10. The device of claim 9, wherein
such status information includes at least one or more of negotiated speed, and duplex setting.

11. A powered device (PD) controller suitable for use within a Power over Ethernet (PoE) PD, the PD controller comprising:
powered device controller circuitry;
a physical medium dependent sublayer; and
a data switch operable to selectively connect either a first physical medium attachment sublayer or a second physical medium attachment sublayer to the physical medium dependent sublayer; and
a switching device configured to receive a signal from the auxiliary processor that transfers power from the auxiliary processor to the main processor after the power level negotiation.

12. The PD controller according to claim 11, wherein each of the powered device controller circuitry, physical medium dependent sublayer, and data switch are collocated on an integrated circuit chip.

13. A method for initializing a Power over Ethernet (PoE) connection comprising:
(a) connecting a PoE power sourcing equipment (PSE) to a PoE powered device (PD), the PoE PSE comprising a PSE controller;
(b) performing, at the PSE controller, a first power level classification in accordance with IEEE 802.3af;
(c) booting up an auxiliary processor located in the PD;
(d) determining whether a second power level classification, in accordance with IEEE 802.3at, has been performed;
(e) negotiating, when the second power level classification has not been performed, by the auxiliary processor, a power level classification using a link layer discovery protocol (LLDP);
(f) booting up a main processor in the PD; and
(g) receiving a signal from the auxiliary processer at a switching device that transfers power from the auxiliary processor to the main processor after the power level negotiation.

14. The method according to claim 13, further comprising:
enabling power to be sent to the main processor by the auxiliary processor prior to the step of booting up the main processor.

15. The method according to claim 13, further comprising:
enabling a data transfer switch by the auxiliary processor subsequent to the step of booting up the main processor.

16. A Power over Ethernet (PoE) Powered Device (PD) comprising:
   a main processor;
   an auxiliary processor configured to negotiate a power level with a PoE Power Sourcing Equipment using a first data link layer in a communications process that is conducted as a software based link layer discovery protocol classification scheme, and further configured to transfer power of the PoE Powered Device from a low power state to a high power state by transmitting a power transfer control signal to a power supply following the power level negotiation with the PoE Power Sourcing Equipment;
   a second data link layer in the communications process that is conducted as a software based link layer discovery protocol classification scheme, wherein the main processor is configured for network communications using the second data link layer; and
   a switching device configured to receive a signal from the auxiliary processor that transfers power from the auxiliary processor to the main processor after the power level negotiation.

17. The device according to claim 16, further comprising:
   a non-volatile memory associated with the auxiliary processor and configured to store a MAC address associated with the main processor, and a required PoE power level.

18. The device according to claim 16, wherein the auxiliary processor is selected from the group consisting of a central processing unit (CPU) integrated circuit, and a state machine implemented on a field programmable gate array (FPGA).

19. The device of claim 16, further comprising:
   an inter-processor communication bus connected between the auxiliary processor and the main processor, and wherein
   the inter-processor communication bus is configured to transfer status information from the auxiliary processor to the main processor prior to transferring power.

20. The device of claim 19, wherein
   such status information includes at least one or more of negotiated speed, and duplex setting.

* * * * *